United States Patent
Vujcic

(10) Patent No.: US 8,295,850 B2
(45) Date of Patent: Oct. 23, 2012

(54) RANDOM ACCESS CHANNEL FREQUENCY ALLOCATION

(75) Inventor: Dragan Vujcic, Limours (FR)

(73) Assignee: LG Electronics Inc., Seoul (KR)

( * ) Notice: Subject to any disclaimer, the term of this patent is extended or adjusted under 35 U.S.C. 154(b) by 544 days.

(21) Appl. No.: 12/368,035

(22) Filed: Feb. 9, 2009

(65) Prior Publication Data

US 2009/0203384 A1 Aug. 13, 2009

Related U.S. Application Data

(60) Provisional application No. 61/027,482, filed on Feb. 10, 2008.

(51) Int. Cl.
*H04W 72/00* (2009.01)
(52) U.S. Cl. ........... 455/450; 370/330; 455/434
(58) Field of Classification Search ........... 455/434, 455/450–453; 370/328–329
See application file for complete search history.

(56) References Cited

U.S. PATENT DOCUMENTS

| | | | |
|---|---|---|---|
| 2007/0064665 A1* | 3/2007 | Zhang et al. | 370/343 |
| 2007/0171889 A1 | 7/2007 | Kwon et al. | |
| 2007/0206531 A1 | 9/2007 | Pajukoski et al. | |
| 2007/0223606 A1* | 9/2007 | Yang et al. | 375/260 |
| 2007/0263579 A1 | 11/2007 | Ozluturk | |
| 2007/0291696 A1 | 12/2007 | Zhang et al. | |
| 2009/0109919 A1* | 4/2009 | Bertrand et al. | 370/330 |

OTHER PUBLICATIONS

3GPP TS 36.211 V8.1.0 (Nov. 2007).*

* cited by examiner

*Primary Examiner* — Vladimir Magloire
(74) *Attorney, Agent, or Firm* — Birch, Stewart, Kolasch & Birch, LLP

(57) ABSTRACT

The present invention provides a method of allocating a frequency parameter for random access preamble transmission. The method includes determining a fixed location, in an operating bandwidth, of a frequency region for random access transmission wherein a relative location parameter defines the fixed location of the frequency region according to a bandwidth parameter, the relative location parameter being common to a plurality of cells. The present invention further provides a method of allocating a frequency parameter for random access transmission. The method comprises allocating a fixed location, in an operating bandwidth, of a frequency region for random access transmission, wherein the fixed location is configurable per cell.

6 Claims, 8 Drawing Sheets

RANDOM ACCESS CHANNEL FREQUENCY ALLOCATION

This application claims priority of U.S. Provisional Application No. 61/027,482 filed on 10 Feb. 2008, the content of which is incorporated herein by reference.

BACKGROUND OF THE INVENTION

1. Field of the Invention

The present invention relates to random access channel (RACH) procedure in a cellular communications network, and in particular to a method and apparatus for allocating a frequency parameter for random access preamble transmission. While it is described below in the context of a long term evolution (LTE) type cellular network for illustrative purposes and since it happens to be well suited to that context, those skilled in the art will recognise that the invention disclosed herein can also be applied to various other types of cellular networks.

2. Discussion of the Related Art

A universal mobile telecommunications system (UMTS) is a 3rd Generation (3G) asynchronous mobile communication system operating in Wideband Code Division Multiple Access (WCDMA) based on a European standard known as Global System for Mobile Communications (GSM), and general packet radio services (GPRS). The LTE of UMTS is under discussion by the 3rd generation partnership project (3GPP) that standardised UMTS.

3GPP LTE is a technology for enabling high-speed packet communications. Many schemes have been proposed for the LTE objective including those that aim to reduce user and provider costs, improve service quality, and expand and improve coverage and system capacity. 3G LTE requires reduced cost per bit, increased service availability, flexible use of a frequency band, a simple structure, an open interface, and adequate power consumption of a terminal as an upper-level requirement.

Figure 1:
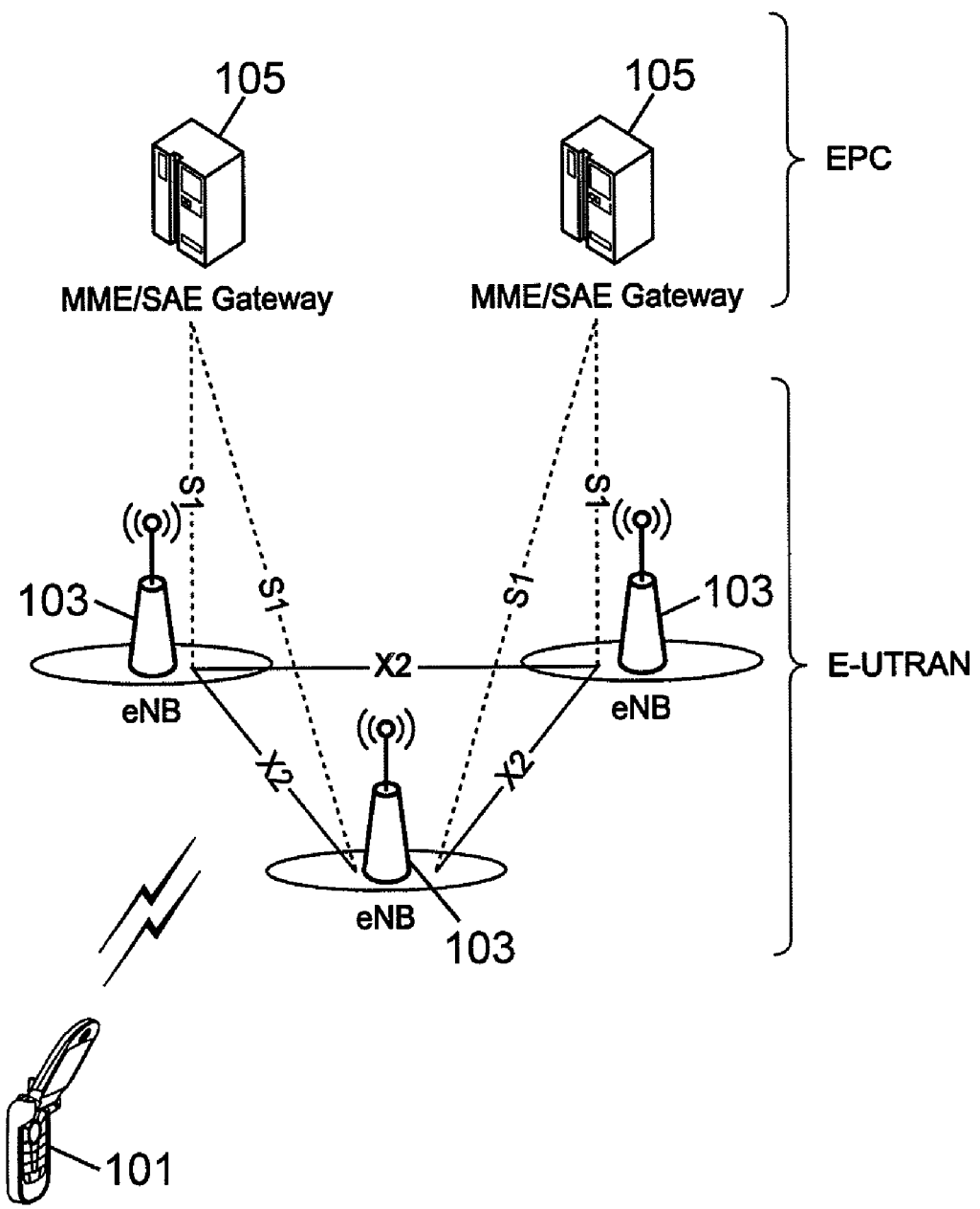

FIG. 1 is a block diagram illustrating a network structure of an evolved universal mobile telecommunication system (E-UMTS). The E-UMTS may be also referred to as an LTE system. The communication network is widely deployed to provide a variety of communication services such as voice and packet data.

As illustrated in FIG. 1, the E-UMTS network includes an evolved UMTS terrestrial radio access network (E-UTRAN) and an evolved packet core (EPC) and one or more user equipments (UEs) 101. The E-UTRAN may include one or more evolved NodeBs (eNodeB, or eNB) 103, and a plurality of UEs 101 may be located in one cell. One or more E-UTRAN mobility management entity (MME)/system architecture evolution (SAE) gateways 105 may be positioned at the end of the network and connected to an external network.

As used herein, "downlink" refers to communication from an eNodeB 103 to a UE 101, and "uplink" refers to communication from the UE 101 to an eNodeB 103. UE 101 refers to communication equipment carried by a user and may be also be referred to as a mobile station (MS), a user terminal (UT), a subscriber station (SS) or a wireless device.

An eNodeB 103 provides end points of a user plane and a control plane to the UE 101. MME/SAE gateway 105 provides an end point of a session and mobility management function for UE 101. The eNodeB 103 and the MME/SAE gateway 105 may be connected via an S1 interface.

The eNodeB 103 is generally a fixed station that communicates with a UE 101, and may also be referred to as a base station (BS), a network entity or an access point. One eNodeB 103 may be deployed per cell. An interface for transmitting user traffic or control traffic may be used between eNodeBs 103.

The MME provides various functions including distribution of paging messages to eNodeBs 103, security control, idle state mobility control, SAE bearer control, and ciphering and integrity protection of non-access stratum (NAS) signalling. The SAE gateway host provides assorted functions including termination of U-plane packets for paging reasons, and switching of the U-plane to support UE mobility. For clarity, MME/SAE gateway 105 will be referred to herein simply as a "gateway," but it is understood that this entity includes both an MME and an SAE gateway.

A plurality of nodes may be connected between the eNodeB 103 and the gateway 105 via the S1 interface. The eNodeBs 103 may be connected to each other via an X2 interface and neighbouring eNodeBs may have a meshed network structure that has the X2 interface.

Figure 2A:
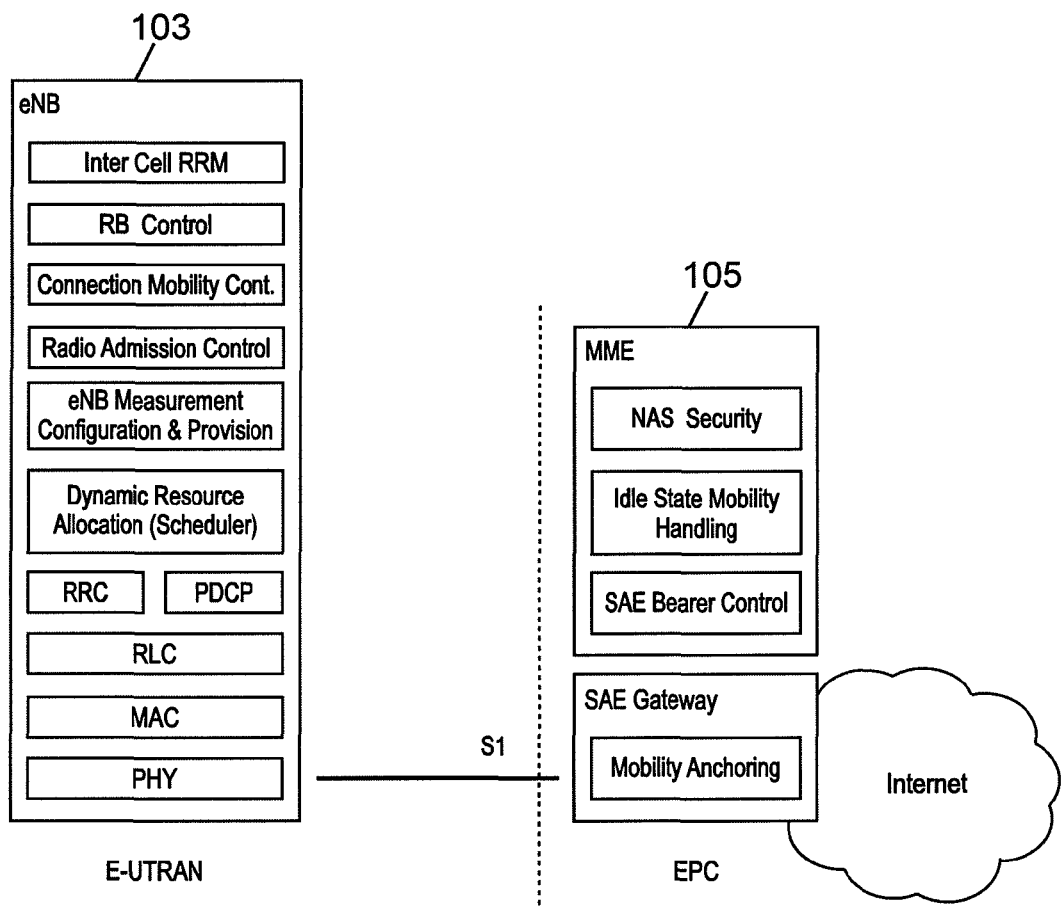

FIG. 2(a) is a block diagram depicting an architecture of a typical E-UTRAN and a typical EPC. As illustrated, eNodeB 103 may perform functions of selection for gateway 105, routing toward the gateway during a radio resource control (RRC) activation, scheduling and transmitting of paging messages, scheduling and transmitting of broadcast channel (BCCH) information, dynamic allocation of resources to UEs 101 in both uplink and downlink, configuration and provisioning of eNodeB measurements, radio bearer control, radio admission control (RAC), and connection mobility control in LTE_ACTIVE state. In the EPC, and as noted above, gateway 105 may perform functions of paging origination, LTE-IDLE state management, ciphering of the user plane, system architecture evolution (SAE) bearer control, and ciphering and integrity protection of non-access stratum (NAS) signalling.

Figure 2B:
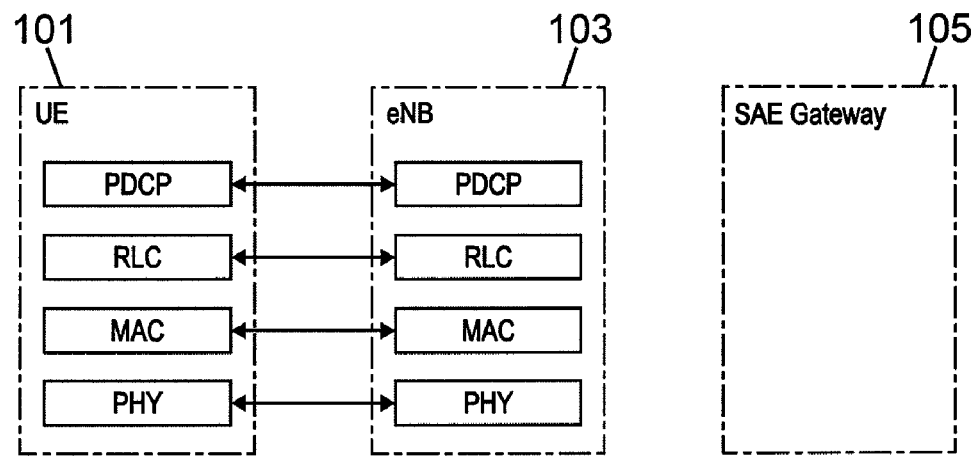
Figure 2C:
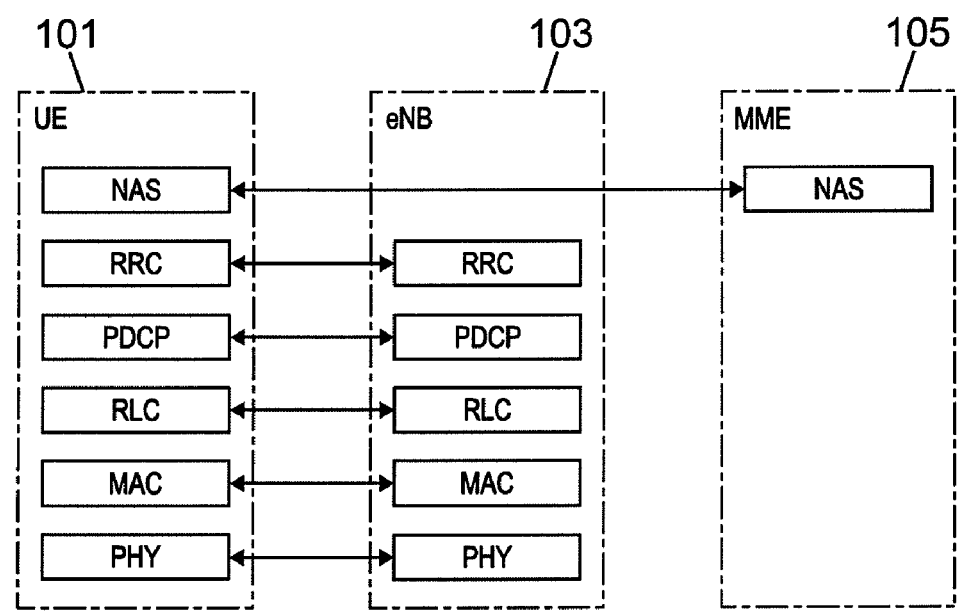

FIGS. 2(b) and 2(c) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The packet data convergence protocol (PDCP) layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in an eNodeB 103 on the network side) may perform functions such as scheduling, automatic repeat request (ARQ), and hybrid automatic repeat request (HARQ). The PDCP layer (terminated in eNodeB 103 on the network side) may perform the user plane functions such as header compression, integrity protection, and ciphering.

As illustrated in FIG. 2(c), the RLC and MAC layers (terminated in an eNodeB 103 on the network side) perform the same functions as for the control plane. As illustrated, the RRC layer (terminated in an eNodeB 103 on the network side) may perform functions such as broadcasting, paging, RRC connection management, RB control, mobility functions, and UE measurement reporting and controlling. The NAS control protocol (terminated in the MME of gateway 105 on the network side) may perform functions such as an SAE bearer management, authentication, LTE_IDLE mobility handling, paging origination in LTE_IDLE, and security control for the signalling between the gateway and UE 101.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRC_CONNECTED.

In RRC_IDLE state, the UE 101 may receive broadcasts of system information and paging information while the UE 101 specifies a discontinuous reception (DRX) configured by NAS, and the UE has been allocated an identification (ID) which uniquely identifies the UE in a tracking area. Also, in RRC-IDLE state, no RRC context is stored in the eNodeB 103.

In RRC_CONNECTED state, the UE 101 has an E-UTRAN RRC connection and a context in the E-UTRAN, such that transmitting and/or receiving data to/from the network (eNodeB) becomes possible. Also, the UE 101 can report channel quality information and feedback information to the eNodeB 103.

In RRC_CONNECTED state, the E-UTRAN knows the cell to which the UE 101 belongs. Therefore, the network can transmit and/or receive data to/from the UE 101, the network can control mobility (handover) of the UE 101, and the network can perform cell measurements for a neighbouring cell.

In RRC_IDLE mode, the UE 101 specifies the paging discontinuous reception (DRX) cycle. Specifically, the UE 101 monitors a paging signal at a specific paging occasion of every UE specific paging DRX cycle.

The procedure where a UE sends a first message to a network is commonly referred to as initial access. In most systems the initial access is initiated by a UE transmitting a connection request message including the reason of the request, and receiving an answer from the network indicating the allocation of radio resources for the requested reason.

In 3GPP TS 25.331 there are several reasons, referred to as establishment causes, for sending a connection request message. Establishment causes include: originating conversational/streaming/interactive/background/subscribed traffic call, terminating conversational/streaming/interactive/background call, emergency call, inter radio access technology (RAT) cell re-selection, inter-RAT cell change order, registration, detach, originating high/low priority signalling, call re-establishment and terminating high/low priority signalling.

An "originating call" establishment indicates that the UE 101 wishes to setup a connection, for instance a speech connection. A "terminating call" establishment indicates that the UE 101 answers to paging. A "registration" establishment indicates that the user wants to register only to the network.

To initiate access to the network a random access procedure is used. The physical random access transmission is under the control of higher layer protocol which performs some important functions related to priority and load control. These procedures differ in detail but GSM, UMTS and LTE radio systems have some similarities between them.

In the random access procedure the UE 101 randomly selects an access resource and transmits a RACH preamble to the network. A preamble is a short signal that is sent before the transmission of the RACH connection request message. The UE 101 can repeatedly transmit the preamble by increasing the transmission power each time the preamble is sent until the network indicates the detection of the preamble. The message part can then be sent at the level of power equal of the last preamble transmission power plus an offset signalled by the network.

A random access channel (RACH) is a common physical channel dedicated to the random access procedure. Uplink transmissions are generally initiated through a RACH. A UE sending data on a RACH has not yet been identified by the target eNB. RACH is typically an uplink common channel used for transmitting control information and user data. It is applied in random access, and used for low-rate data transmissions from the higher layer. Such a channel is said to be contention-based since many users can attempt to access the same base station simultaneously, leading to collisions. A RACH channel can be used for several purposes. For example the RACH can be used to access the network, to request resources, to carry control information, to adjust the time offset of the uplink in order to obtain uplink synchronisation, to adjust the transmitted power, etc.

A random access procedure can be launched by the UE or the eNodeB. It may, for instance, be triggered by the following events:
  a UE switches from power-off to power-on and needs to be registered to the network.
  a UE is not time-synchronized with a eNodeB and starts transmitting data (for instance the user calls).
  a eNodeB starts transmitting data to the UE but they are not synchronized (for instance the user receives a call).
  a eNodeB measures a delay of the received signal from the UE (for instance the user is moving and has lost synchronization).
  a UE is moving from one cell to another and needs to be time-synchronized with a different target eNodeB than the serving eNodeB it is registered to (handover).

Figure 3:
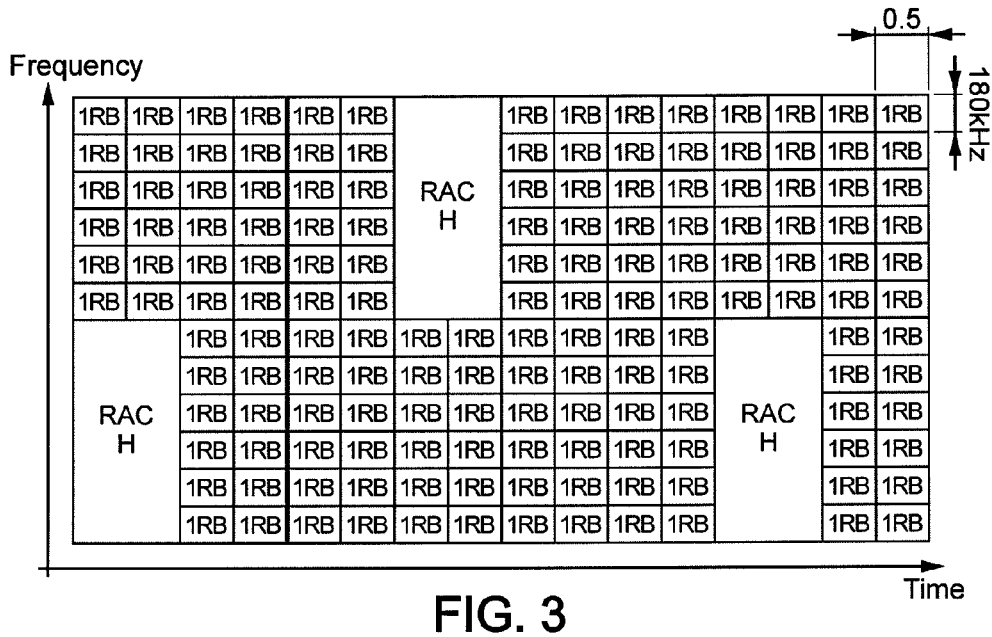

In LTE, the basic unit of time is a slot (generally of a duration of 0.5 ms). Two slots make up a subframe and ten subframes constitute a radio frame. A random access channel typically occupies 6 resource blocks in a subframe or set of consecutive subframes reserved for random access preamble transmissions. A RACH period can be configured to be, for example, 1 ms, 2 ms, 5 ms and 10 ms. FIG. 3 shows one possible mapping of the RACH within a resource grid.

Figure 4:
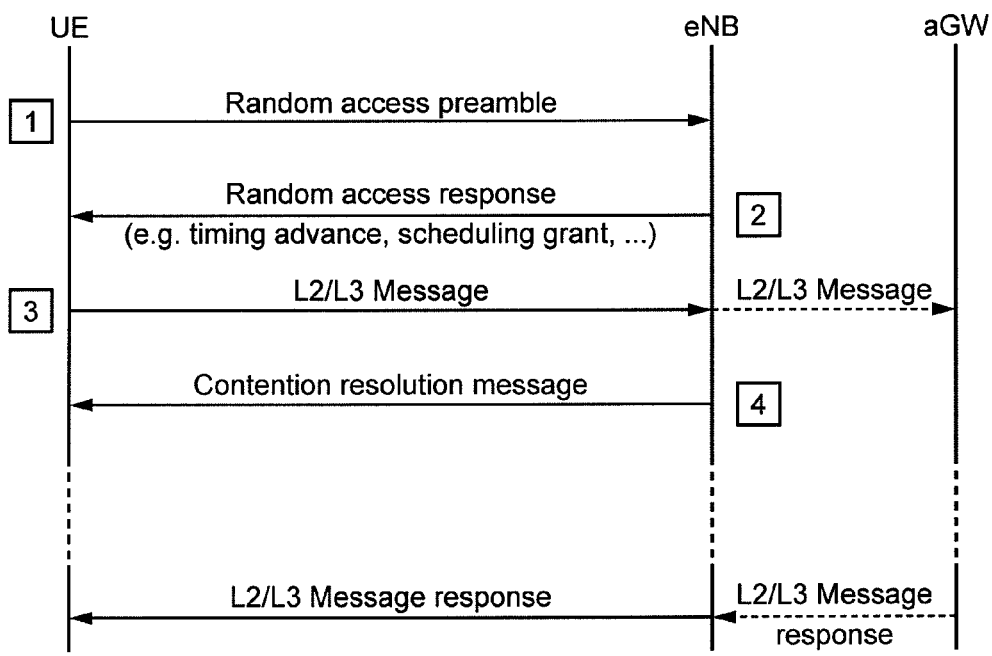

FIG. 4 illustrates the sequences of messages and responses exchanged between a user equipment UE 101 and a base station eNB 103 in a typical RACH procedure.

Firstly the UE 101 retrieves information transmitted periodically from eNB 103 on a downlink broadcast channel (BCH) and selects a preamble signature, a RACH time slot and a frequency band. The preamble signature is chosen by the UE 101 from among a set of signatures known by the eNB 103. The UE 101 generates a single random access burst containing the chosen signature and transmits it to the eNB 103 over the selected time slot at the selected frequency in message 1.

Figure 5:
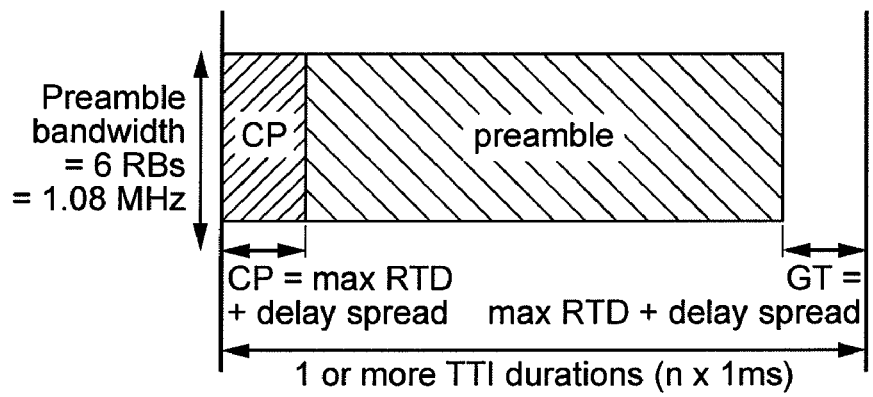

The random access burst consists of a cyclic prefix, a preamble, and a guard time during which nothing is transmitted as illustrated in FIG. 5. CP denotes cyclic prefix, GT denotes guard time, RTD denotes round trip delay and TTI denotes transmission time interval.

The preamble is sent before a RACH connection request and indicates that the UE is about to transmit data. The random access burst is transmitted during one subframe. While the UE is not synchronized in the time domain, its random access burst may overlap with the next subframe and generate interference. A guard time may thus be added to combat interference. The guard time (GT) should be at least equal to the round-trip delay at the cell edge.

During the random access procedure, several users share the same channel. They are distinguishable by virtue of orthogonal sequences. These sequences are seen as the UE preamble signatures that can be transmitted simultaneously. A collision occurs whenever several users choose the same signature and send it within the same time and frequency resources.

The eNB 103 monitors the current RACH slot in an attempt to detect preambles transmitted from UEs in the corresponding cell.

On reception of a signal the eNB 103 correlates the received signal in the RACH sub-frame with all possible signatures. Detection of the preamble can be either performed in the time domain or in the frequency domain. A detection variable is computed for each signature. If the detection variable exceeds a certain threshold, the preamble is considered detected.

The eNB 103 sends a random access response to acknowledge the successfully detected preambles in message 2. This message is sent on a dedicated downlink channel and uses the detected signature. It contains a timing advance command, a power-control command. If the procedure is contention-free then the UE and the eNodeB are thereby aligned in the time domain.

If the UE 101 receives a response from the eNB 103 the UE 101 decodes the response and adapts its transmission timing, and its transmission power if the response contains power control information. The UE 101 then sends a resource request message—message 3—on a dedicated uplink channel. In this message, the UE requests bandwidth and time resources to transmit data and it also indicates a UE-specific identifier. If the UE requests resources, the UE 101 uses a specific ID in the message to resolve contentions. Then the UE monitors a specified downlink channel for response from the eNB. In the case of a positive resource grant, the subsequent transmissions are carried out as normal.

The eNB attempts to resolve any contentions. If the eNB 103 receives a resource request with a UE-specific signature the eNB 103 checks how many UEs were detected with the same signature and resolves any possible contentions. If the preamble sent by UE 101 was in collision with a preamble from another UE, the eNB 103 sends a contention resolution message—message 4—to give the command to UE 101 to re-start the RACH procedure. If on the other hand the UE 101 was not in collision, the eNB sends a resource assignment message—message 5. In this case the subsequent transmissions are carried out as usual. The eNB 103 identifies the UE 101 and assigns resources according to the scheduling rules applied.

In the random access response, message 2, the UE may receive an ACK signal from the eNB to indicate that a message can be sent, a NACK signal indicating that the preamble was detected but a message cannot to be sent, or no response indicating that the preamble was not detected.

In the case where UE 101 receives no response indicating that a preamble has not been detected at the first attempt the UE 101 waits for the next RACH slot to send another preamble. The preamble signal-to-noise ratio (SNR) is relatively low compared to data SNR owing to the length of the zero-correlation sequences. Given that the random access channel does not generate much interference, the UE can afford to increase the transmission power by a few decibels (dB) at the second attempt to prevent consecutive failures (power ramping method). A too long delay is not desirable, especially in the case of handovers. The UE 101 repeatedly transmits the preamble by increasing the transmission power every time the preamble is sent until the network indicates the detection of the preamble. The procedure is exited after a certain number of failures. If a preamble is successfully transmitted the message part is generally sent at the level of power equal to the last preamble transmission power plus an offset signaled by the network.

One reason why a preamble may not be detected on a first attempt may be severe channel attenuation. If the next RACH slot occupies the same position in frequency domain then the channel is likely to fade again and the preamble undetected. Frequency hopping for RACH has been introduced to increase the detection performance of preamble retransmission by means of frequency diversity. drawback of frequency hopping is that it requires more overhead in broadcast information and may introduce delay in the case of handovers.

In order to simplify a random access frequency hopping pattern and to maximize the frequency diversity gain two PRACH frequency hopping regions, located either at the top or the bottom of the PUCCH (physical uplink control channel) bandwidth are typically employed. It has been agreed that PUCCH uses a reserved frequency regions for transmission. The PUCCH resources typically consist of number of resource blocks, at each edge of the transmission bandwidth, resulting in the frequency hopping at the slot boundary as illustrated in FIG. 5. In the case of initial access or handover (HO) a UE thus needs to determine which frequency position, at the top or at the bottom of the bandwidth, allows PRACH transmission.

Moreover, the number of resources assigned for PUCCH transmission within the cell can be even or odd. Consequently, in order to determine the PRACH allocation, the UE should receive system information concerning the uplink carrier bandwidth (or resource blocks) and the number of resources assigned for PUCCH transmission. In the case of a handover (HO) these parameters should be transmitted in a handover command message.

By positioning the PRACH frequency location next to the PUCCH frequency band, PUSCH (physical uplink shared channel) segmentation is minimized. However the PRACH frequency location changes according to the PUCCH assigned resources. The following parameters must be transmitted with PRACH parameters and explicitly signalled Uplink bandwidth $N_{RB}^{UL}$ PUCCH-resource-size An object of the present invention is to address at least one of the aforementioned problems and to improve the RACH procedure.

SUMMARY OF THE INVENTION

According to a first aspect of the present invention there is provided a method of allocating a frequency parameter for random access preamble transmission transmission, the method comprising: determining a fixed location, in an operating bandwidth, of a frequency region for random access transmission; wherein a relative location parameter defines the fixed location of the frequency region according to a bandwidth parameter, the relative location parameter being common to a plurality of cells.

In this way less additional information is required by the UE for allocating a frequency. The relative location parameter may be defined by an operating standard or selected by a network entity. Data on the bandwidth size or the PUCCH resource size is not required for operation.

According to a second aspect of the present invention there is provided a method of allocating a frequency parameter for random access preamble transmission, the method comprising allocating a fixed location, in an operating bandwidth, of a frequency region for random access transmission, wherein the fixed location is configurable per cell.

In this way preamble collision may be reduced since the frequency location is configurable per cell and the number of PRACH configuration needed may be reduced.

According to a third aspect of the present invention there is provided a user equipment for allocating a frequency parameter for random access preamble transmission, the user equipment comprising: a transceiver; a processor for determining a fixed location, in an operating bandwidth, of a frequency region for random access transmission; wherein the processor is operable to determine the fixed location according to a relative location parameter for defining the fixed location of the frequency region as a function of a bandwidth parameter, the relative location parameter being common to a plurality of cells.

The methods according to the invention may be computer implemented. The methods may be implemented in software on a programmable apparatus. They may also be implemented solely in hardware or in software, or in a combination thereof.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION THE DRAWINGS

Embodiments of the invention will now be described, by way of example only, and with reference to the following drawings in which:—

FIG. 1 is a block diagram illustrating network structure of an E-UMTS (or LTE) system.

FIGS. 2(*a*), 2(*b*) and 2(*c*) are block diagrams depicting logic architecture of typical network entities of the LTE system (FIG. 2(*a*)), a user-plane (U-plane) protocol stack (FIG. 2(*b*)) and a control-plane (C-plane) protocol stack (FIG. 2(*c*)).

Figure 6:
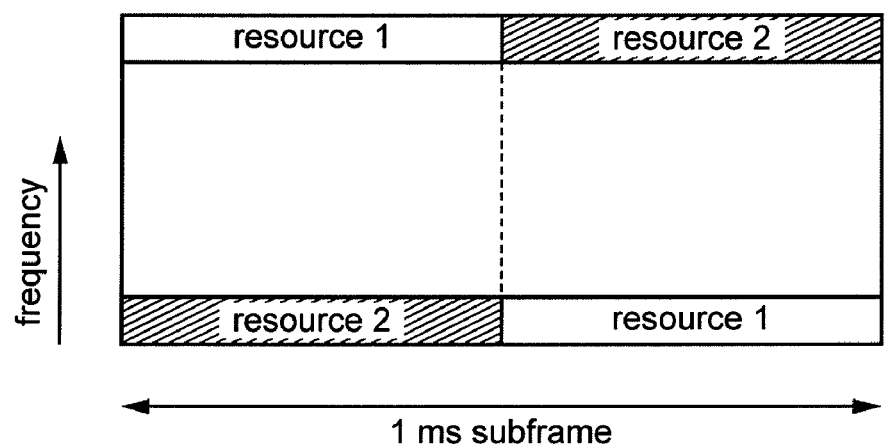
Figure 7:
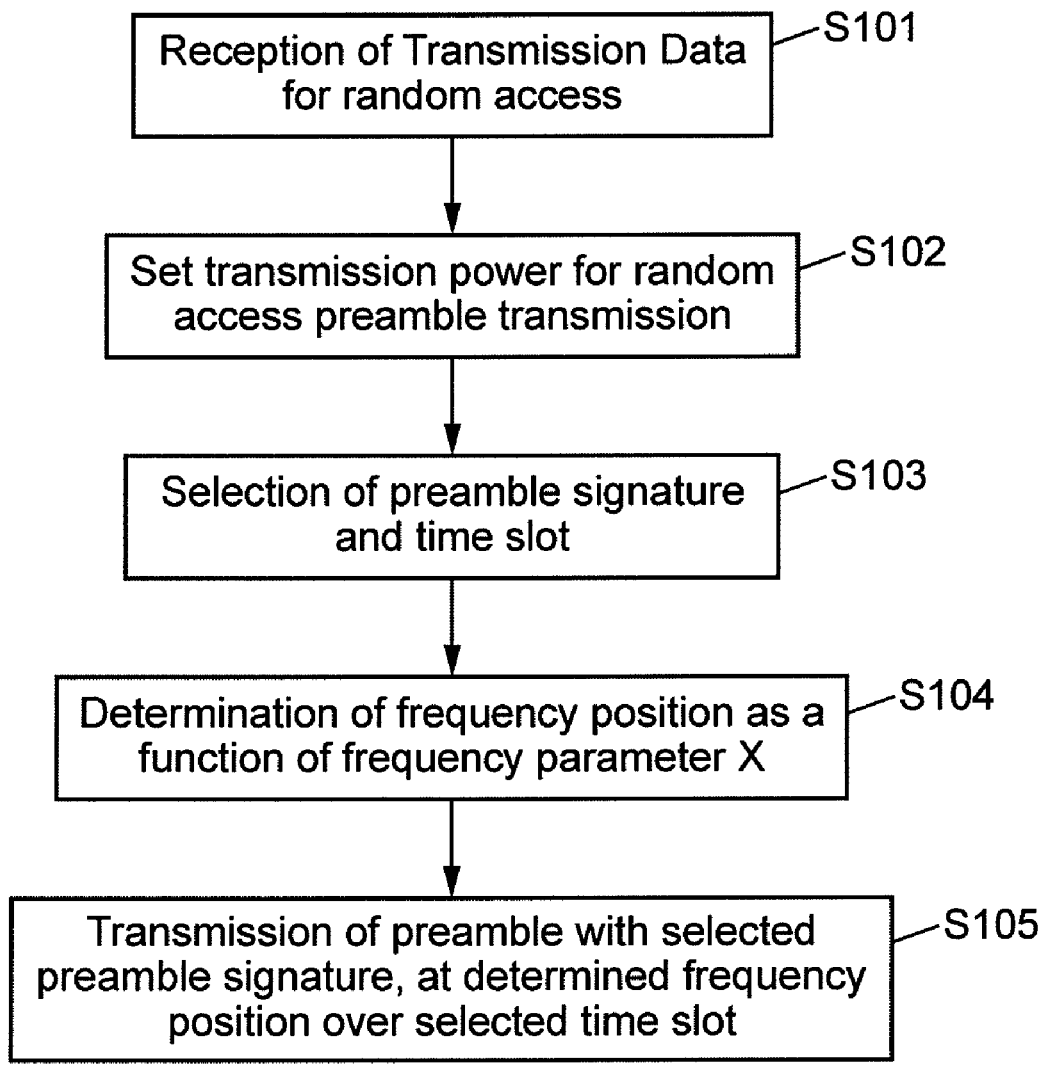

FIG. 3 graphically illustrates an example of the location of RACH slots in a 2.5 MHz bandwidth FIG. 4 is a diagram illustrating a typical RACH procedure FIG. 5 schematically illustrates a RACH preamble structure in E-UMTS FIG. 6 graphically illustrates an example of the location of PUCCH slots in an operating bandwidth FIG. 7 is a flow chart illustrating a method of random access transmission according to at least one embodiment of the present invention.

Figure 8A:
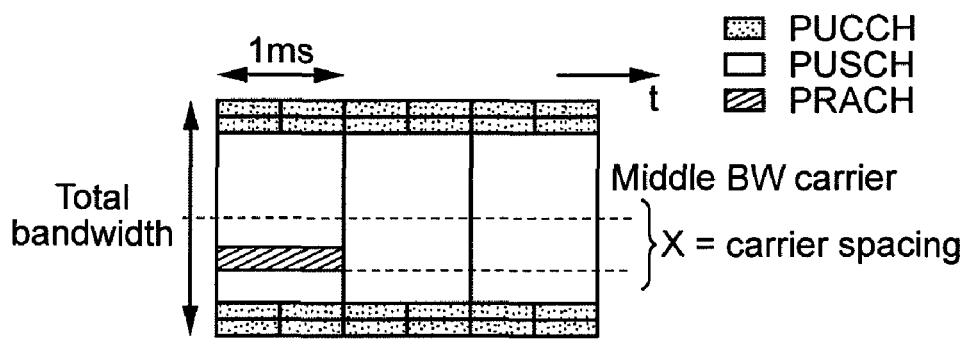

FIG. 8A schematically illustrates locating PRACH frequency relative to the middle of the operating bandwidth according to a first embodiment of the invention.

Figure 8B:
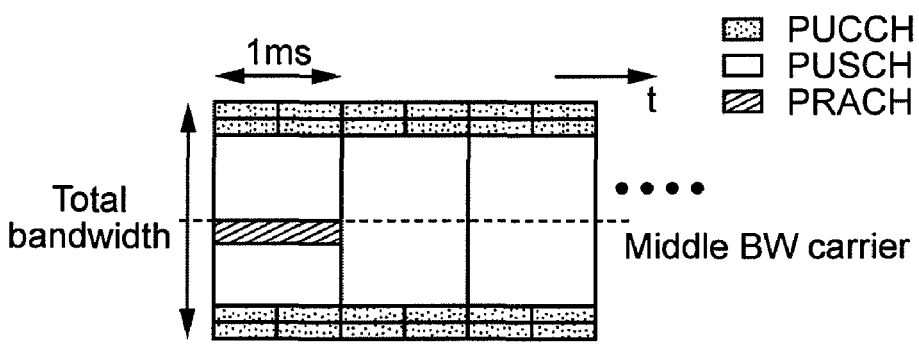

FIG. 8B schematically illustrates locating PRACH frequency at the middle of the operating bandwidth according to a first embodiment of the invention.

Figure 9:
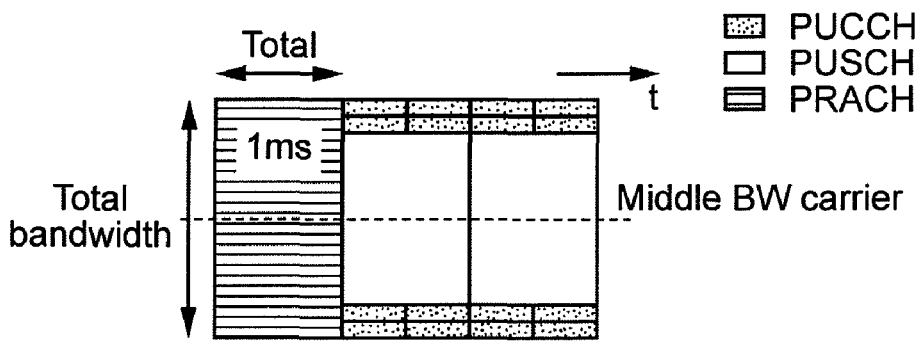

FIG. 9 schematically illustrates allocating a position for PRACH frequency according to a further embodiment of the invention.

Figure 10:
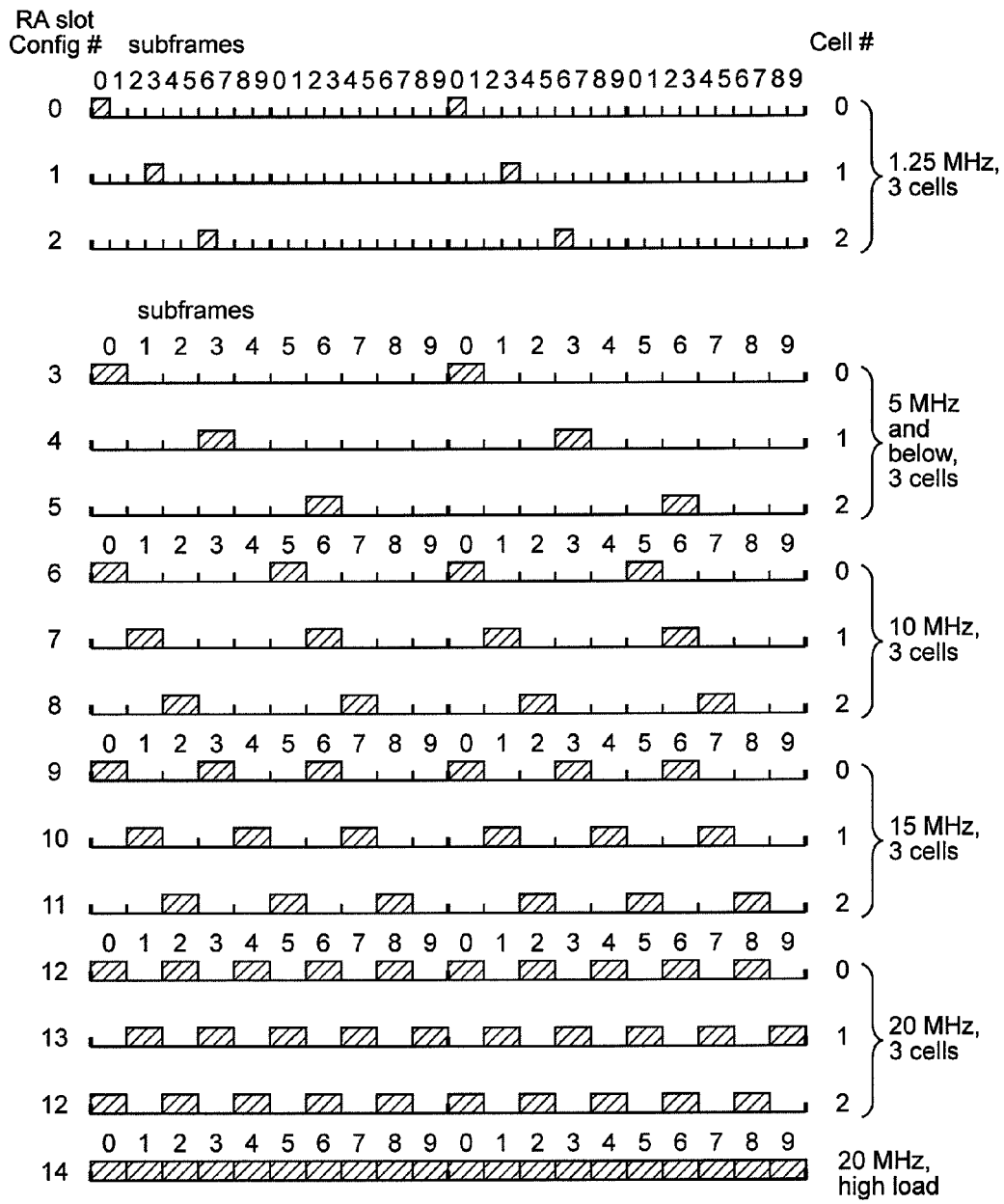

FIG. 10 illustrates an example of PRACH time slots configuration/

DESCRIPTION OF PREFERRED EMBODIMENTS

Reference will now be made in detail to embodiments of the present invention, examples of which are illustrated in the accompanying drawings.

Embodiments of the present invention are directed to a RACH initial access procedure between a UE and an eNodeB and in particular to the procedure of setting transmission parameters at the UE.

FIG. 7 illustrates a random access procedure in LTE according to the first embodiment of the present invention. A random access procedure between a user equipment UE 101 and a base station eNodeB 103 is initiated by UE 101 after UE 101 has received transmission information transmitted periodically from eNodeB 103 on a downlink broadcast channel in step S101. Such information includes available preamble signatures in the cell, period of available RACH slots, target power etc. In step S102 UE 101 sets its transmission power according to the signal attenuation measured in the downlink channel. An open-loop power control procedure can be used to obtain a suitable transmission power. In this procedure, the UE 101 estimates path loss from a downlink reference signal and sets the transmission power to achieve a signal-to-noise ratio (SNR) target indicated by the eNB 103. The eNB 103 may fix the targeted SNR upon the measured level of interference in the uplink channel. The shadowing in the uplink path may differ from the shadowing in the downlink path because the carrier frequency has changed.

In step S103 UE 101 randomly selects a preamble signature and a RACH time slot. The preamble signature is chosen by the UE 101 from among a set of signatures known by the eNodeB 103. Preamble signatures should portray good auto-correlation properties in order for the eNodeB 103 to obtain an accurate timing estimation for a single preamble; and good cross correlation properties in order for the eNodeB 103 to obtain an accurate timing estimation for different preambles transmitted simultaneously by different UEs.

In 3GPP RAN1 Zadoff-Chu (ZC) sequences can be used to fulfil these requirements. Each cell possesses a set of 64 signatures obtained from Zadoff-Chu sequences. The length of one sequence is N=839 samples. A ZC sequence is defined by two integers: u is the root index and v is the cyclic shift index.

In the time domain, the v-th cyclic shift is extracted from the u th root with: $x_{u,v}(n)=x_u(n+v \cdot N_{CS})$ n=0 ... N−1 where $N_{CS}$ is the cyclic shift length. The u-th root sequence in the frequency domain is given by:

$$x_u(n) = e^{j\pi \cdot u \cdot \frac{n(n+1)}{N}}$$

The ZC sequences can be used because they can generate a large number of sequences and they offer interesting correlation properties: the autocorrelation function shows no side peaks. The cross correlation between two sequences obtained from different roots is $\sqrt{N}$. Thus ZC sequences have zero-cross-correlation zones.

In step S104, the UE 101 uses a frequency parameter X to determine the frequency position for the RACH transmission. The parameter X may be indicated to the UE 101 by an eNodeB of the network, for example eNodeB 103, or alternatively it may be set by a standard according to the operating bandwidth. In this embodiment of the invention the frequency parameter X is common to all cells the UE 101 finds itself in, is constituted of a frequency offset with respect to the middle band width carrier as illustrated in FIG. 8A

The range of frequency parameter X is expressed as:

$$0 \leq X \leq (N_{RB}^{UL}-6)/2$$

where $N_{RB}^{UL}$ denotes the uplink bandwidth configuration, expressed in multiples of resource blocks in the frequency domain expressed as a number of subcarriers.

If, for example, X=0 the frequency position for transmission is set next to the middle carrier bandwidth as illustrated in FIG. 8B.

It will be appreciated that setting a frequency location next to the middle carrier bandwidth may reduce the flexibility for the PUSCH allocation to the single UE. However this flexibility reduction can be resolved since the eNodeB 103 is able to schedule uplink data transmission on resource blocks that fall in the random access channel.

In an alternative embodiment of the invention, frequency parameter X may be used to determine the frequency location as a function of the total operating bandwidth. In this case frequency parameter X can be multiplied by the total bandwidth to determine the frequency location within the operating bandwidth for RACH transmission. In this alternative embodiment of the invention the frequency parameter X may be common to all base station cells of the UE.

It will be understood that while in the aforementioned embodiments the frequency parameter X may be common to all cells in which the UE 101 may be located, it will be understood that the determined frequency position will vary according to the operating bandwidth. If the operating bandwidth does not change then the frequency position within that operating bandwidth will be the same in each cell.

In step S105 UE 101 then transmits to the eNB 103 a random access burst including the preamble signal containing the preamble signature over the selected time slot at the selected frequency position within the operating bandwidth.

On reception of a signal the eNB 103 correlates the received signal in the RACH sub-frame with all possible signatures. Detection of the preamble can be either performed in the time domain or in the frequency domain. A detection variable is computed and if the detection variable exceeds a certain threshold, the preamble is considered detected.

The eNB 103 sends a random access response to the UE 101 to acknowledge any successfully detected preambles according to the RACH procedure.

The foregoing embodiments of the invention provide the advantage that no additional signaling is required for the UE apart from the frequency offset X. The frequency offset may be set prior to the initiation of the RACH procedure. For example it may be set by an operating standard or transmitted to the UE by the network.

A second embodiment of the invention is illustrated in FIGS. 7 and 9. In the second embodiment of the invention the frequency parameter X determining the frequency location is indicated to UE 101 by the network. In this embodiment the range of parameter X is given by:

$$0 \leq X \leq (N_{RB}^{UL}-6)$$

where $N_{RB}^{UL}$ denotes the uplink bandwidth configuration, expressed in multiples of resource blocks in the frequency domain expressed as a number of subcarriers.

The frequency band allocated for PRACH can be located anywhere in the operating bandwidth as illustrated in FIG. 9

In the second embodiment the location of the frequency band for RACH transmission can be configurable per cell. The PRACH time slot configuration is designed to minimize the number of random access slots occurring in the same sub frame among three cells (0, 1 and 2) within the same eNodeB as illustrated in FIG. 10. Since in the second embodiment of the invention the frequency location for RACH preamble transmission is configurable per cell and can thus be different for each cell, preamble collision may be avoided for all system bandwidths since the difference in allocated frequency location can be used to distinguish preambles from one another. This is particularly important in a 20 MHz operating bandwidth where preambles between 3 cells collide as illustrated in FIG. 10.

Moreover the number of required PRACH configurations can be reduced as illustrated in Tables 1 and 2. Table 1 tabulates random access preamble timing assuming the same PRACH frequency location among cells while Table 2 tabulates random access preamble timing assuming the configurable PRACH frequency location among cells

TABLE 1

Random access preamble timing assuming the same PRACH frequency location among cells

| PRACH configuration | System frame number | Subframe number |
|---|---|---|
| 0 | Even | 1 |
| 1 | Even | 4 |
| 2 | Even | 7 |
| 3 | Any | 1 |
| 4 | Any | 4 |
| 5 | Any | 7 |
| 6 | Any | 1, 6 |
| 7 | Any | 2, 7 |
| 8 | Any | 3, 8 |
| 9 | Any | 1, 4, 7 |
| 10 | Any | 2, 5, 8 |
| 11 | Any | 3, 6, 9 |
| 12 | Any | 0, 2, 4, 6, 8 |
| 13 | Any | 1, 3, 5, 7, 9 |
| 14 | Any | 0, 1, 2, 3, 4, 5, 6, 7, 8, 9 |
| 15 | Even | 9 |

TABLE 2

Random access preamble timing assuming the configurable PRACH frequency location among cells

| PRACH configuration | System frame number | Subframe number | System BW (MHz) |
|---|---|---|---|
| 0 | Even | 1 | 1.4 |
| 1 | Any | 1 | 5 |
| 2 | Any | 1, 6 | 10 |

TABLE 2-continued

Random access preamble timing assuming the configurable PRACH frequency location among cells

| PRACH configuration | System frame number | Subframe number | System BW (MHz) |
|---|---|---|---|
| 3 | Any | 1, 4, 7 | 15 |
| 4 | Any | 1, 3, 5, 7, 9 | 20 |
| 5 | Any | 0, 1, 2, 3, 4, 5, 6, 7, 8, 9 | 20, high load |

While embodiments of the present invention has been hereinbefore described in relation to the illustrative case of a 3GPP LTE system, those skilled in the wireless communication art will appreciate that the invention is applicable to communications systems other than 3GPP LTE systems.

Many further modifications and variations will suggest themselves to those versed in the art upon making reference to the foregoing illustrative embodiments, which are given by way of example only and which are not intended to limit the scope of the invention, that being determined solely by the appended claims.

The invention claimed is:

1. A method of determining a frequency location for random access preamble transmission, the method comprising:
receiving a frequency parameter related to a frequency region for random access transmission; and
determining a frequency location, in an operating bandwidth, of the frequency region for the random access transmission based on the frequency parameter,
wherein the frequency parameter is defined as a frequency offset X relative to the middle of the operating bandwidth,
wherein the range of the frequency offset X is expressed as $X \leq (N_{RB}^{UL}-6)/2$,
where $N_{RB}^{UL}$ represents the operating bandwidth expressed in multiples of resource blocks in the frequency region, and
wherein the determined frequency location is configured per cell and is different for each cell.

2. The method of claim 1, wherein the frequency location is determined as a function of the total operating bandwidth.

3. The method of claim 1, wherein the frequency offset X is expressed as a number of sub-carriers in the frequency region.

4. The method of claim 1, wherein the frequency parameter is selected by the network entity.

5. The method of claim 1, wherein the frequency parameter is defined in an operating standard.

6. An apparatus for determining a frequency location for random access preamble transmission, the apparatus comprising:
a transceiver configured to receive a frequency parameter related to a frequency region for random access transmission; and
a processor configured to determine a frequency location, in an operating bandwidth, of the frequency region for the random access transmission based on the frequency parameter;
wherein the frequency parameter is defined as a frequency offset X relative to the middle of the operating bandwidth,
wherein the range of the frequency offset X is expressed as $X \leq (N_{RB}^{UL}-6)/2$,
where $N_{RB}^{UL}$ represents the operating bandwidth expressed in multiples of resource blocks in the frequency region, and
wherein the determined frequency location is configured per cell and is different for each cell.

* * * * *